(12) United States Patent
Gillard

(10) Patent No.: US 10,449,850 B2
(45) Date of Patent: Oct. 22, 2019

(54) MOTOR VEHICLE BODY COMPRISING SHUTTERS WITH SPLITTERS AND ASSOCIATED VEHICLE

(71) Applicant: AUTOMOTIVE EXTERIORS EUROPE, Lyons (FR)

(72) Inventor: Laurent Gillard, Southfield, MI (US)

(73) Assignee: FLEX-N-GATE FRANCE, Audincourt (FR)

( * ) Notice: Subject to any disclaimer, the term of this patent is extended or adjusted under 35 U.S.C. 154(b) by 0 days.

(21) Appl. No.: 15/773,119

(22) PCT Filed: Dec. 6, 2016

(86) PCT No.: PCT/EP2016/079936
§ 371 (c)(1),
(2) Date: May 2, 2018

(87) PCT Pub. No.: WO2017/097775
PCT Pub. Date: Jun. 15, 2017

(65) Prior Publication Data
US 2018/0312052 A1 Nov. 1, 2018

(30) Foreign Application Priority Data
Dec. 7, 2015 (EP) .................................... 15306945

(51) Int. Cl.
*B60K 11/08* (2006.01)
(52) U.S. Cl.
CPC ............ *B60K 11/085* (2013.01); *Y02T 10/88* (2013.01)

(58) Field of Classification Search
CPC .................................................. B60K 11/085
See application file for complete search history.

(56) References Cited

U.S. PATENT DOCUMENTS

| 8,646,552 | B2 * | 2/2014 | Evans | ................. B60K 11/085 180/68.1 |
| 10,183,573 | B1 * | 1/2019 | Klop | ..................... B60K 11/08 |

(Continued)

FOREIGN PATENT DOCUMENTS

| EP | 1 074 419 A2 | 2/2001 |
| EP | 1 831 047 A1 | 9/2007 |
| EP | 2 574 484 A1 | 4/2013 |

OTHER PUBLICATIONS

International Search Report, dated Feb. 17, 2017, from corresponding PCT/EP2016/079936 application.

*Primary Examiner* — Erez Gurari
(74) *Attorney, Agent, or Firm* — Young & Thompson

(57) ABSTRACT

Disclosed is a motor vehicle body, the body having a front surface, the front surface defining at least one air inlet, the body including at least one frame, the frame facing the air inlet, at least one shutter being mounted on the frame and extending across the frame, the shutter extending along a main axis along a transversal direction and defining at least one main guiding surface, the shutter being able to guide the airflow along a plane containing the main guiding surface. At least one splitter is located on the shutter, the splitter defining at least one secondary guiding surface, the secondary guiding surface forming a non-zero angle with the main guiding surface, the splitter being able to guide the airflow along a plane containing the secondary guiding surface.

12 Claims, 4 Drawing Sheets

(56) References Cited

U.S. PATENT DOCUMENTS

| | | | | |
|---|---|---|---|---|
| 2003/0029581 A1* | 2/2003 | Vide | ............ | B60K 11/085 |
| | | | | 160/201 |
| 2013/0081785 A1* | 4/2013 | Yoo | ............ | B60K 11/085 |
| | | | | 165/96 |
| 2014/0216834 A1* | 8/2014 | Elliott | ............ | B60K 11/085 |
| | | | | 180/68.1 |
| 2014/0273807 A1* | 9/2014 | Frayer | ............ | B60K 11/085 |
| | | | | 454/335 |
| 2015/0274002 A1* | 10/2015 | Vacca | ............ | B60K 11/085 |
| | | | | 180/68.1 |
| 2016/0214464 A1* | 7/2016 | Stenger | ............ | B60K 11/085 |
| 2016/0236563 A1* | 8/2016 | Ruppert | ............ | B60K 11/085 |
| 2017/0050510 A1* | 2/2017 | Manhire | ............ | B60K 11/085 |
| 2017/0096060 A1* | 4/2017 | Povinelli | ............ | B60K 11/085 |
| 2017/0326967 A1* | 11/2017 | Brueckner | ............ | F01P 7/10 |
| 2017/0326970 A1* | 11/2017 | Schoening | ............ | B60K 11/085 |
| 2017/0361701 A1* | 12/2017 | Dunty | ............ | B60R 19/52 |
| 2018/0009492 A1* | 1/2018 | Watanabe | ............ | B60K 11/04 |
| 2018/0086199 A1* | 3/2018 | Solazzo | ............ | B60K 11/085 |
| 2018/0134146 A1* | 5/2018 | Vacca | ............ | B60K 11/085 |
| 2018/0312052 A1* | 11/2018 | Gillard | ............ | B60K 11/085 |
| 2019/0039452 A1* | 2/2019 | Herlem | ............ | B60K 11/085 |

* cited by examiner

US 10,449,850 B2

MOTOR VEHICLE BODY COMPRISING SHUTTERS WITH SPLITTERS AND ASSOCIATED VEHICLE

The invention relates to a motor vehicle body, the body having a front surface, the front surface defining at least one air inlet, the body comprising at least one frame, the frame facing the air inlet, at least one shutter being mounted on the frame and extending across the frame, the shutter extending along a main axis along a transversal direction and defining at least one main guiding surface, the shutter being able to guide the airflow along a plane containing the main guiding surface.

The invention relates also to a motor vehicle comprising such a body.

BACKGROUND OF THE INVENTION

Most motor vehicles comprise a grille defining an air inlet. The majority of the air passing through the air inlet then passes through the fins of a radiator located behind the grille to cool down the coolant inside the radiator, which in turn keeps the engine cool.

However, during certain driving conditions, there is more air passing through the air inlet than is needed to keep the engine cool. Moreover, that excess of air passing through can add significant aerodynamic drag to the car, increasing the amount of fuel used by the car.

To adapt the amount of air passing through to reach the radiator, motor vehicles can now be equipped with active grille shutters mounted on a frame between the grille and the engine or forming the grille itself. The shutters are, for example, moveable in rotation around vertical or transversal axes of the frame to limit the amount of air passing through the shutters and subsequently reaching the engine.

However, sometimes air coming from the air inlet does not directly reach the whole surface of the radiator. The radiator, for example, may be larger than the air inlet. In that case, air coming from the air inlet will mostly reach the centre of the radiator, and only a portion of the radiator will be used to cool down the coolant. The radiator is therefore not used in an efficient way. In this case, the shutters are not used to optimize the flow of air in order to use efficiently the radiator.

SUMMARY OF THE INVENTION

One of the aims of the invention is to optimize the flow of air reaching a radiator and therefore better use the radiator. A smaller unit can then be chosen while still being able to cool the engine. Being smaller, the unit will be lighter and therefore will improve the fuel consumption of the vehicle.

According to the invention, this object is achieved by a motor vehicle body of the previous type, wherein at least one splitter is located on the shutter, the splitter defining at least one secondary guiding surface, the secondary guiding surface forming a non-zero angle with the main guiding surface, the splitter being able to guide the airflow along a plane containing the secondary guiding surface.

The splitter guides the airflow in a different direction from that of the main guiding surface. One can have a better control over the airflow that reaches the radiator and optimise the airflow such as to cool down the whole radiator in an even manner with the right amount of air coming through.

According to particular embodiments, the inventive motor vehicle body includes one, several or all of the following features, in all technically possible combinations:

- the shutter is moveable in rotation around the main axis to modify the plane containing the main guiding surface;
- the shutter is moveable in a closed position, wherein no air flows through the frame;
- the splitter is located on a lower face of the shutter, the shutter being moveable between a lower position, wherein the splitter is located below the shutter, and the closed position;
- the splitter is located on an upper face of the shutter, the shutter being moveable between an upper position, wherein the splitter is located above the shutter, and the closed position;
- the part of the splitter closest to the front surface in an open position is closest to a main central plane of the frame;
- a plurality of splitters is located on the shutter;
- the splitters are distributed on one of the faces of the shutter;
- in the closed position, the splitters are located inside the body;
- the splitters are laid out every 30 mm up to 60 mm;
- the secondary guiding surfaces of at least two splitters form a non-zero angle between them, such that the planes containing said secondary guiding surfaces are not parallel;
- the angle formed between the secondary guiding surfaces of two adjacent splitters is comprised between 1° to 60°;
- a plurality of shutters are mounted on the frame, the shutters being parallel to each other, at least one splitter being located on each shutter; and
- the shutters are similar, the splitter being located similarly on the shutters.

The invention also relates to a motor vehicle having a body as previously described, an engine mounted within the body, a radiator for cooling the engine, air flowing through the frame being controlled by the shutter and the splitter to flow towards the radiator.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE PREFERRED EMODIMENTS

Figure 1:
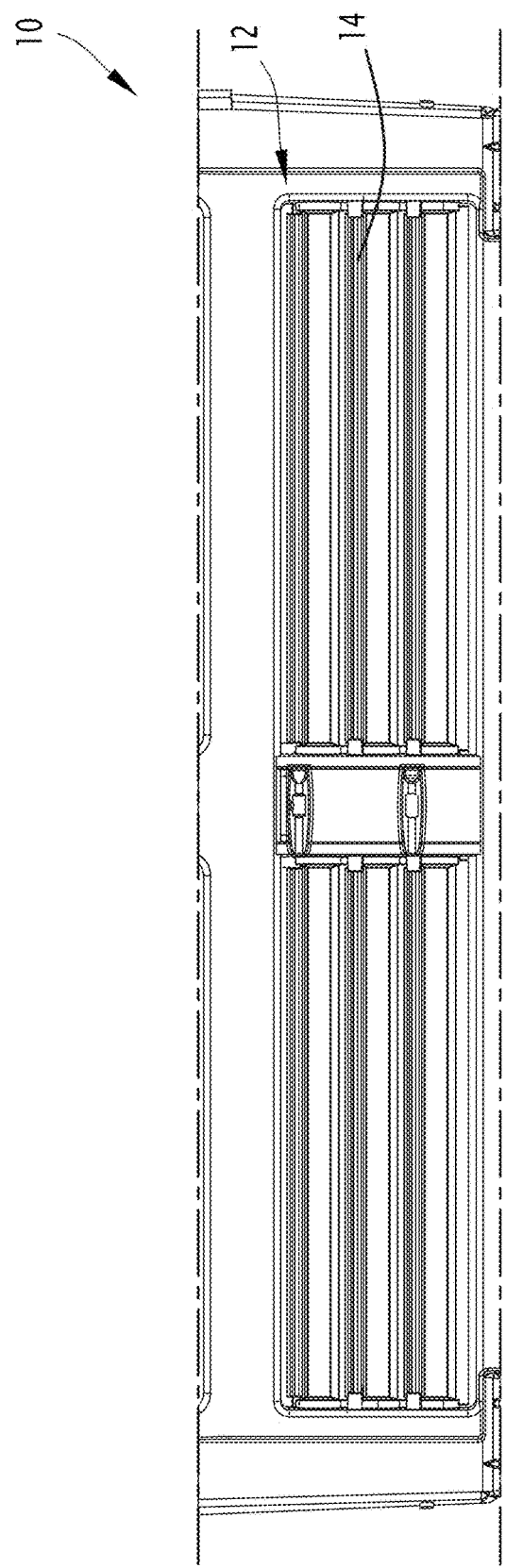
FIG. 1 is a perspective three-quarters front view of a part of a motor vehicle body according to an embodiment of the invention, the shutters being in a closed position.

In the specification, the terms "longitudinal" and "vertical" are defined relative to the usual direction of a motor vehicle.

In reference to FIGS. 1, 2, 3 and 4, a motor vehicle body will be described.

The motor vehicle body is provided for a motor vehicle (not depicted) also comprising an engine mounted within the body and a radiator for cooling the engine.

The body 10 has a front surface (not depicted) defining at least one air inlet, for example equipped with a grille.

The air inlet is substantially at the centre in front of the radiator. The air inlet extends for example on 50% to 100% of the width of the front surface.

Alternatively, the air inlet is formed of several openings in the front surface, which is for example formed of a bumper fascia part.

The radiator is mounted between the air inlet and the engine.

The body 10 comprises at least one frame 12, at least one shutter 14 mounted on the frame 12 and at least one splitter 16 located on the shutter 14.

The frame faces the air inlet and is located behind it, between the front surface and the radiator. The frame extends along a vertical plane that is substantially parallel to the front surface.

According to an alternative embodiment, the frame 12 is formed of the same part that defines the air inlet, for example a bumper. In this case, the air inlet is formed in the frame and there is not intermediate part between the air inlet and the radiator, the shutters being mounted directly on the air inlet. In this alternative, the front surface is formed by the frame.

The frame 12 comprises two lateral edges 18 extending between a lower edge 20 and an upper edge 22.

The frame 12 is, for example, substantially rectangular.

A plane substantially equidistant to the two lateral edges 18 is called the main central plane P of the frame.

The edges 18, 20, 22 delimit an opening 24. The opening is for example of the same dimension as the air inlet.

According to the embodiment shown in the figures, the frame 12 comprises one intermediate rod 26 extending across the opening 24. The intermediate rod 26 is substantially parallel and equidistant to the lateral edges 18. The main central pane P of the frame extends through the intermediate rod 26 and the frame 12 is substantially symmetrical relative to the main central plane P.

In this embodiment, the body 10 comprises a plurality of shutters 14 comprising two ends 28, 30, one end 28 being mounted on the intermediate rod 26 and the other end 30 on one of the lateral edges 18. This means that the body comprises two sets of shutters, each one of these sets extending in one of the openings defined by a lateral edge 18 and the intermediate rod 26.

The shutters 14 extend across the frame 12 along a respective main axis X substantially perpendicular to main central plane P. The main axis X is the transversal direction defined relatively to the shutter.

The shutters are parallel to each other and to the lower and upper edges 20, 22.

Each shutter 14 comprises at least an upper surface 44 and a lower surface 46, forming the faces of the shutter.

Each shutter defines at least one main guiding surface 32.

The upper surface 44 and the lower surface 46 each form a main guiding surface 32.

The shutter is able to guide the airflow along a plane containing the main guiding surface 32. Consequently, a shutter 14 guides the flow of air along the planes containing the upper surface 44 and the lower surface 46.

Each shutter is moveable in rotation around its main axis X. The rotation modifies the respective plane containing the main guiding surface 32 of each shutter. The shutters are moveable between a closed position and at least one open position.

Figure 2:
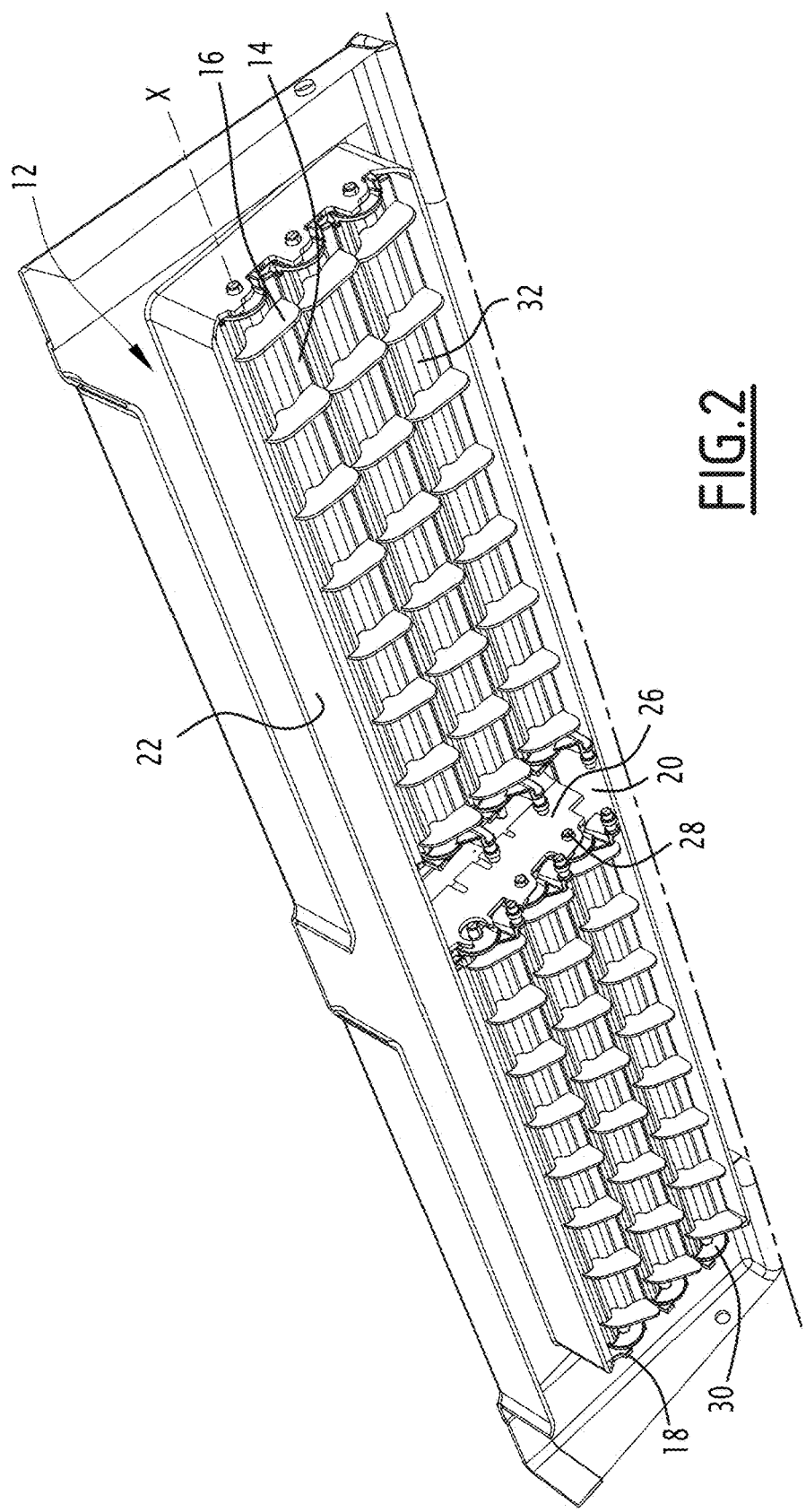
FIG. 2 is a perspective three-quarters back view of what is depicted in FIG. 1.

In the closed position, represented on FIGS. 1 and 2, the shutters fill the opening 24 and prevent air from flowing through.

Figure 3:
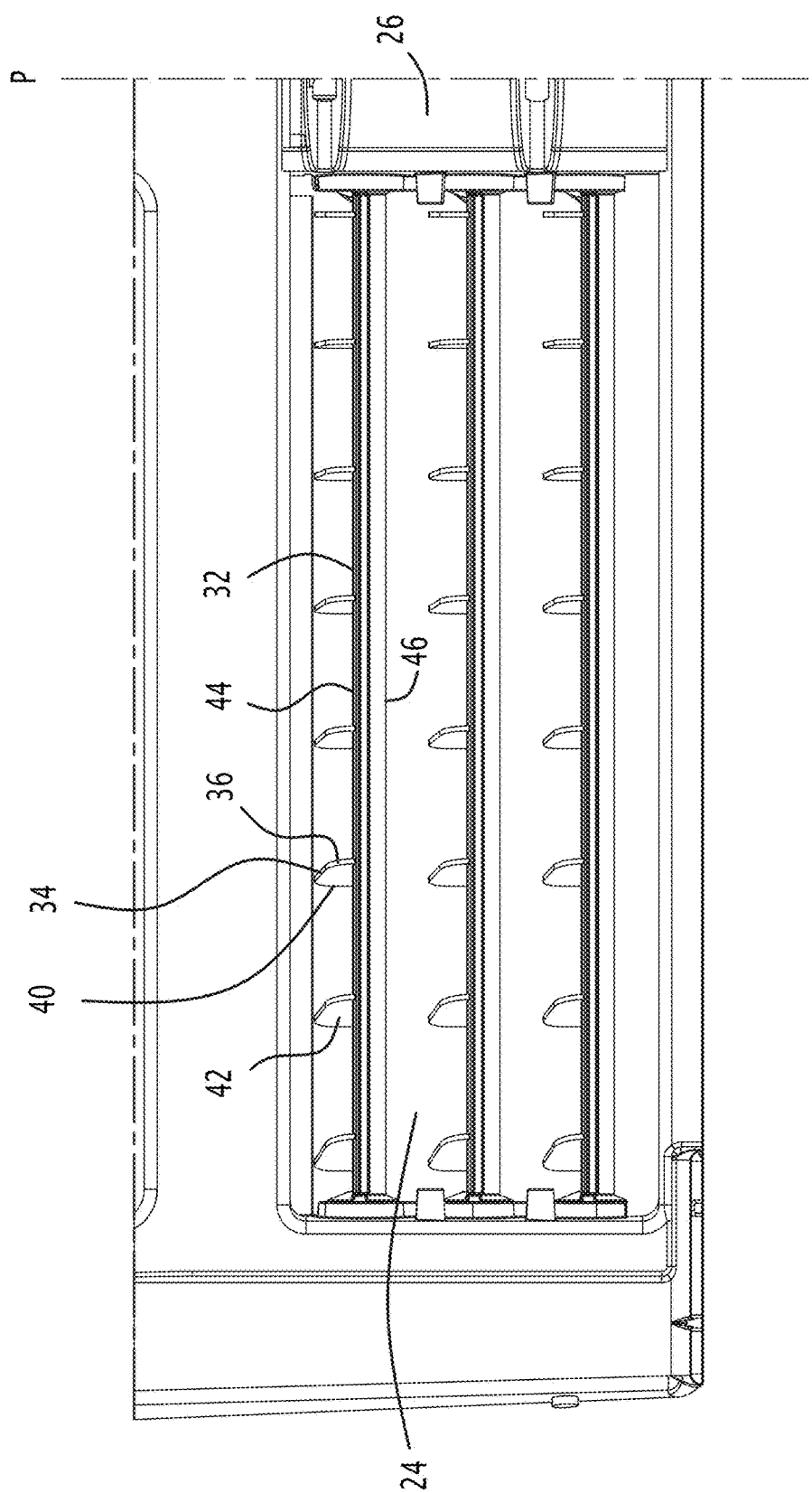
FIG. 3 is a perspective front view of a detail of FIG. 1, the shutters being in an opened position.
Figure 4:
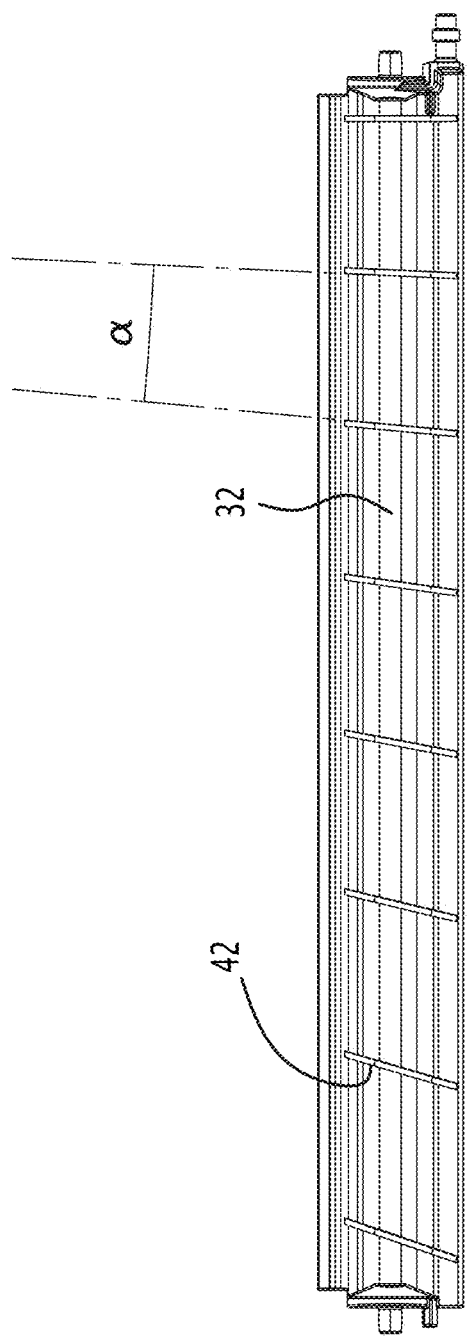
FIG. 4 is a perspective view of a single shutter of the embodiment of FIG. 1.

In one of the open positions represented on FIG. 3, the main guiding surfaces 32 of the shutters 14 extend generally horizontally. The shutters let air flow through the opening 24 and guide the airflow along the main guiding surface 32. The upper surface 44 is located above the lower surface 46.

The rotation of the shutters 14 is, for example, controlled by an actuator connected to the electrical system of the vehicle via a connector.

According to an embodiment, the rotation of the shutters is synchronized such that the upper and lower surfaces of one shutter remain parallel to the upper and lower surfaces of the other shutters.

The opening or the closing of the shutters is decided according to the need for cooling the engine and/or other elements within the body. Temperature sensors of the engine or the other elements are, for example, connected to the electrical system of the vehicle. According to signals emitted by these sensors, the electrical system is arranged to control the rotation of the shutters accordingly.

In one embodiment, the shutters 14 may be moveable in at least one intermediate open position between the open position and the closed position.

In the depicted embodiment, a plurality of splitters 16 is located on each shutter.

Each splitter 16 has the shape of a fin located on a shutter and extending away from it. It has, for example, the shape of a half-disk.

The free end of the splitter, i.e. the end not attached to the shutter, is the top part 34. The part closest to the front surface in the open position is referred to as the front part 36. The part furthest to the front surface in the open position is referred to as the rear part 40, as best seen in FIG. 3.

The splitters may be formed integrally with the shutter or formed separately and then mounted on the shutter.

The splitters are distributed on one of the faces of the shutter, for example, on one of the main guiding surface 32.

The splitters are laid out every 30 mm up to 60 mm.

The splitters are laid out on the face across the shutter according to the best results obtained by a Computational Fluid Dynamics analysis (CFD) and/or testing.

On the pictured solution in the closed position, the splitters are located inside the body, i.e. the splitters are turned towards the radiator and not towards the exterior of the vehicle but it could be also conceived to have the splitters in the front as long as they are acceptable from a styling point of view.

In one embodiment, the splitters are located on the lower face 46 of the shutter. When the shutters are in the open position, the splitters 16 are located below the shutter 14. The height of the splitters of the shutter is inferior to the space between the said shutter and the shutter situated just below it or the lower edge 20 of the frame, such that the shutters may be moveable between the closed position and the open position without interfering with another shutter or with the frame 12.

In another embodiment, the splitters are located on the upper face 44 of the shutter. When the shutters are in the open position, the splitters 16 are located above the shutter 14. The height of the splitters of the shutter is inferior to the space between the said shutter and the shutter situated just above it or the upper edge 22 of the frame, such that the shutters may be moveable between the closed position and the open position without interfering with another shutter or with the frame 12.

Each splitter 16 defines at least one secondary guiding surface 42. The splitter is able to guide the airflow along a plane containing the secondary guiding surface 42.

The secondary guiding surface 42 forms a non-zero angle with the main guiding surface 32. According to the embodiment shown in the figures, the secondary guiding surface is substantially perpendicular to the main guiding surface.

In the closed position, the plane containing the secondary guiding surface forms a non-zero angle with every vertical or horizontal plane, except, for example, for the splitter closest to the main central plane P which is substantially along a vertical surface parallel to the main central plane P.

The front part 36 is closest to the main central plane P of the frame. The rest of the splitter 16 extends away from the main central plane P. The rear part 40 is the furthest from the main central plane P. This means that the distance separating the splitter 16 from the main central plane P increases from the front part 36 to the rear part 40.

The secondary guiding surface 42 of the splitter 16 is the one facing the air inlet in the open position of the shutter.

In the open position, air flowing through the opening 24 is guided by the secondary guiding surface 42 to flow towards the lateral edges of the frame, in addition to the guiding of the main guiding surface 32.

The secondary guiding surfaces of the splitters on the same shutter form pairwise a non-zero angle between them, i.e. the planes containing the secondary surfaces of two different splitters are not parallel.

In the open position, the splitters are increasingly aslant compared to the longitudinal direction when they are further from the main central plane P, meaning that the angle formed between a given splitter and central plane P is greater than the angle formed between an other splitter and central plane P when said given splitter is further from the central plane than said other splitter.

The angle α formed between the secondary guiding surfaces of two adjacent splitters is, for example, comprised between 1° and 60°.

With the above-described arrangement, in the open position, air flowing through the opening 24 is guided by the splitters on the whole surface of the radiator.

The shutters are for example similar and the splitters on the different shutters are located similarly on the shutters, such as to produce standardised pieces. Splitters are organized in columns, as visible in FIGS. 2 and 3.

Alternatively, the splitters are organized in staggered rows.

Air flowing through the frame 12 is controlled by the shutters 14 and the splitters 16 to flow towards the radiator. The splitter allows the control of the airflow along the transversal direction of the shutter. The air passing through the air inlet is thus optimised to cool down the radiator when necessary, while limiting the aerodynamic drag to the vehicle.

In one embodiment, the frame 12 does not comprise an intermediate rod 26. A plurality of shutters 14 extend across the whole opening 24 between the lateral edges 18.

In another embodiment, the frame 12 comprises more than one intermediate rod 26 and more than two sets of shutters. In that case, some shutters are mounted on two different intermediate rods 26.

The main guiding surface 32 and the secondary guiding surface 42 may be not flat.

The invention claimed is:

1. A motor vehicle body, comprising:
   a front surface, which defines at least one air inlet; and
   at least one frame, the frame facing the air inlet,
   with at least one shutter being mounted on the frame and extending across the frame, the shutter extending along a main axis along a transversal direction and defining at least one main guiding surface, the shutter being configured to guide an airflow along a plane containing the main guiding surface,
   wherein splitters are located on the shutter, the splitters defining at least one secondary guiding surface, the secondary guiding surface forming a non-zero angle with the main guiding surface, the splitters guiding the airflow along a plane containing the secondary guiding surface,
   wherein the shutter is moveable in rotation around the main axis to modify the plane containing the main guiding surface, the shutter being moveable between a closed position and an open position, and
   wherein, in the open position, respective angles of each one of said splitters with respect to a longitudinal direction increase with a distance of any one of said splitter from a main central plane.

2. The motor vehicle body according to claim 1, wherein the shutter is moveable in a closed position, wherein no air flows through the frame.

3. The motor vehicle body according to claim 2,
   wherein the splitters are located on a lower face of the shutter, the shutter being moveable between the closed position, and a lower position in which the splitters are located below the shutter.

4. The motor vehicle body according to claim 2, wherein the splitters are located on an upper face of the shutter, the shutter being moveable between the closed position, and an upper position in which the splitters are located above the shutter.

5. The motor vehicle body according to claim 1, wherein a portion of the splitter closest to the front surface in the open position is closest to a main central plane of the frame.

6. The motor vehicle body according to claim 1, wherein the splitters are distributed on one of the faces of the shutter.

7. The motor vehicle body according to claim 6,
   wherein the shutter is moveable in a closed position, wherein no air flows through the frame, and
   wherein, in the closed position, the splitters are located inside the body.

8. The motor vehicle body according to claim 6, wherein the splitters are laid out every 30 mm up to 60 mm.

9. The motor vehicle body according to claim 1, wherein secondary guiding surfaces of at least two of said splitters form a non-zero angle therebetween, such that planes containing said secondary guiding surfaces are not parallel.

10. The motor vehicle body according to claim 1, wherein an angle formed between secondary guiding surfaces of two adjacent ones of said splitters is between 1° and 60°.

11. The motor vehicle body according to claim 1, wherein a plurality of shutters are mounted on the frame, the shutters being parallel to each other and at least two splitters being located on each shutter.

12. A motor vehicle, having a body according to claim 1 and an engine mounted within the body that includes a radiator for cooling the engine, the shutter and the splitters configured to control air that flows through the frame to flow towards the radiator.

* * * * *